Nov. 17, 1959  P. D. BECKER  2,912,734
FASTENING DEVICE
Filed Nov. 29, 1955
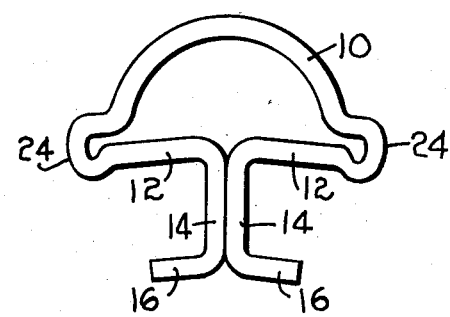
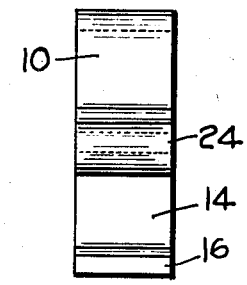
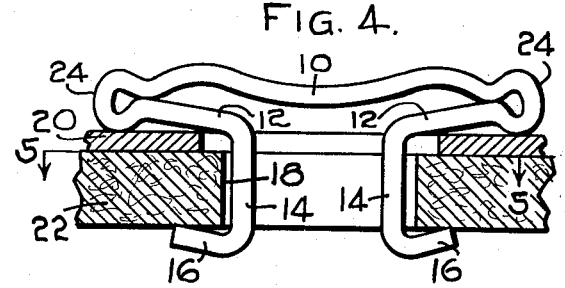
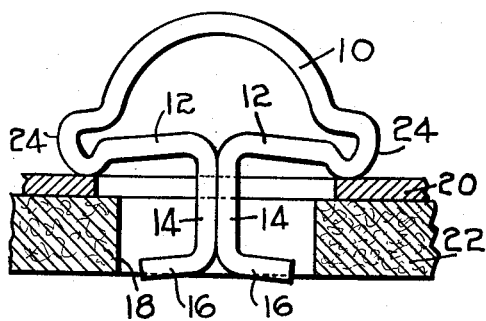
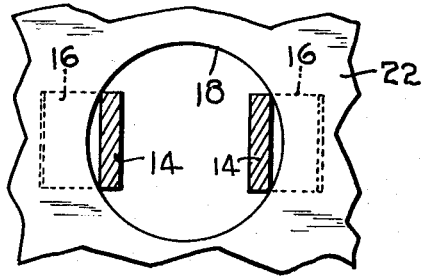
INVENTOR:
PHILIP D. BECKER,
BY Robert E Ross
ATTORNEY.

United States Patent Office 2,912,734
Patented Nov. 17, 1959

2,912,734

FASTENING DEVICE

Philip D. Becker, Hingham, Mass., assignor to United-Carr Fastener Corporation, Boston, Mass., a corporation of Delaware Application November 29, 1955, Serial No. 549,643

4 Claims. (Cl. 24—73)

This device relates to a fastening device for securing anchorage in a hole and by means of which two members may be secured together. The fastener may be applied from one side of an assembly and be operated on and set or clenched by manipulation at the same side either because the further side is inaccessible or because of the greater convenience of operating from one side only. The invention contemplates a simple structure set by the stroke of a tool on the exposed end of the fastener, and it may be distinguished from the fasteners in which a tool or accessory is introduced through the fastener or through the hole in which the fastener is placed in order to upset parts at the further side.

My invention will be well understood by reference to the following description of an illustrative embodiment thereof shown by way of example in the accompanying drawings wherein:

Fig. 1 is a side elevation of the fastener;

Fig. 2 is an end elevation thereof;

Fig. 3 is a section through two superposed pieces of sheet material having superposed holes therein with the fastener positioned in the holes ready to be set;

Fig. 4 shows the same structure after the fastener has been set; and

Fig. 5 is a section on the line 5—5 of Fig. 4.

Referring now to Figs. 1 and 2 of the drawings, the fastener here shown is a narrow strip of metal which is doubled and bent to provide an arched back 10 from the ends of which (the springing points of the arch) are inbent, two arms 12 at the inner end of which arms the axially extending portions 14 (which may be back to back as shown) provide a shank. From the distal end of parts 14, relatively short arms 16 extend outwardly.

The extent of the arms 16 is such that, as seen in Fig. 3 the parts in the position of Fig. 1 may pass easily, preferably by the movement of direct axial approach without any buttoning action into a hole 18 adapted to receive the fastener, and which hole is formed in the superposed members 20 and 22 which are to be connected together. On the other hand, the arms 12 have such a length that the arch of back 10 spans the hole, and the ends of the arms corresponding to the springing points of the arch rest on the margins of the hole, that is on the surface of the member 20 surrounding the hole. Preferably they have a line engagement with the surface adjacent their outer extremities and herein the arms 12 and the arch 10 are joined by beads 24 which elevate in the first instance the arms 12 from the outer surface of the part 20 so that they are spaced from the mouth of the hole 18. Also, in the example shown the arms incline upwardly and inwardly from the beads and the arms 16 may be parallel thereto. The significance of this will appear.

In the use of the fastener it is inserted in the hole in the manner illustrated in Fig. 3 and then the arched back 10 is struck with a hammer to flatten it and the fastener will be distorted to the clenched form of Fig. 4. If one considers one half of the device, as shown in Fig. 3, as if it were an independent, rigid structure, it will be clear that a blow struck at a point corresponding to the top of the arch would rock the structure about the bead 24, advancing the shanks 14 axially of the hole and also tending to tip the arms 16 at the lower end outwardly. In the setting operation motions of this kind are communicated to the shanks and arms, but since the two beads 24 are bound together by the arch, they also move apart when the arch is flattened and the outwardly facing U-shaped portions defined by the shanks 14 and their two arms 12 and 16 move radially outward to engage the margins of the hole in the manner shown in Fig. 4.

It is obvious that the size and proportions of the fastener must be fairly definitely related to the cross section of the hole in which it is to be anchored, and when anchorage is secured as in the example illustrated by engagement of arms 16 behind the inner surface of an interior member such as 22 to the thickness of the parts transversed by the hole and which are to be secured together, it will be apparent that in the upset form of Fig. 4 it is desirable that the ends of the arms 16 engage firmly the under surface of the part 22, clamping the assembled members 20 and 22 between the same and the engaging surfaces of the beads 24. The perpendicular distance between the sides of the U should not greatly exceed and in practice may be slightly less than the nominal combined thickness of the parts to be joined. I have found that when in the initial form of the fastener the arms 12 are supported as described and the arms 12 and 16 are inclined as shown, this is effected if the length of the shanks is such that the distal sides of the arms 16 just about reach to the under surface of the part 22 as seen in Fig. 3. In the setting operation the U-shaped portions are tilted and the arms 16 carried through the hole, and their extremities directed upwardly against the inner surface of the part 22 as shown. If it should happen that the ends of the arms are not carried completely clear of the inner surface of part 22, nevertheless, if the material of that part is not too hard, for instance when it is a sheet of hardboard so-called, the upwardly facing corners of the end surfaces of arms 16, which in the case of a round hole engage first at the extremity of the chord, may cut or indent the material slightly without objection. However, in the example shown, wherein the anchorage is secured primarily by contact with the exposed inner surface of part 22, the ends of the arms are not sharpened or otherwise specifically formed to enable them to force their way into the material forming the wall of a deep hole to effect anchorage thereto in the manner of a nail or like penetrating fastener.

It will be apparent that the span of the arch (the chord between its springing points) must be of such length as to span the hole, and the arch must be such that the excess of its length over that of its chord exceeds the sum of the clearances of the ends of the distal arms 16 from the sides of the hole, and preferably approximates the sum of the clearances of the shanks 14 from the sides of the hole, taking into account in the case of flat stock in a round hole that the shanks will first seat on the walls of the hole at the extremities of a chord.

It is apparent from what has been said that the material of the fastener while not soft is malleable and can be deformed as described and retain its transformed shape. In its application it in some ways resembles a rivet. It is not a "snap" fastener and has no high temper which in fact would render it too brittle for use as described.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to be appended claims to indicate those principles of the invention exemplified by the particular embodiment described and which I desire to secure by Letters Patent.

I claim:

1. A fastener for use in the manner of a rivet in securing together superposed parts by gripping the relatively remote surfaces thereof radially to mating holes therethrough through which holes a connecting portion of the fastener extends, said fastener being formed from a doubled strip of malleable metal and comprising a shank formed of two laterally adjacent longitudinally extending parts of length corresponding substantially to the combined depths of the holes, the shank parts having, distally thereof, relatively short arms extending substantially radially outward adapted to be passed through the holes by a movement of axial approach approximately to a position beyond the bounding plane of the rearward face of the superposed parts and, proximally, relatively long outwardly extending arms adapted to span the holes and seat on the margins thereof at the frontward face of the parts, and a back forming a rearward arch the ends of which are integrally joined to the outer extremities of the second mentioned arms, the difference between the length of the arch and its chord exceeding the sum of the radial clearances of the ends of said relatively short arms from the sides of the holes.

2. A fastener as set forth in claim 1 wherein the outward extremities of the proximal arms are disposed forwardly of their inner ends and the distal arms are substantially parallel to the inner portions of the proximal arms.

3. A fastener as set forth in claim 1 wherein the proximal arms incline forwardly to bearing points adjacent their said extremities which engage the margin of the hole and the distal arms likewise incline forwardly.

4. A fastener as set forth in claim 1 wherein the proximal arms are joined to the back by beads providing forwardly projecting bearings for the arms on the margins of the hole.

References Cited in the file of this patent

UNITED STATES PATENTS

| | | |
|---|---|---|
| 2,032,315 | Chaffee | Feb. 25, 1936 |
| 2,611,166 | Wiley | Sept. 23, 1952 |
| 2,681,487 | Poupitch | June 22, 1954 |

FOREIGN PATENTS

| | | |
|---|---|---|
| 430,693 | Great Britain | June 24, 1935 |
| 1,107,934 | France | Aug. 17, 1955 |